(Model.)

J. J. PEARSON.
BEE HIVE.

No. 327,716. Patented Oct. 6, 1885.

WITNESSES:
Chas. Nida
C. Sedgwick

INVENTOR:
J. J. Pearson
BY Munn & Co.
ATTORNEYS.

UNITED STATES PATENT OFFICE.

JOSEPH J. PEARSON, OF BATESVILLE, MISSISSIPPI, ASSIGNOR TO HIMSELF AND JOHN M. COX, OF SAME PLACE.

BEE-HIVE.

SPECIFICATION forming part of Letters Patent No. 327,716, dated October 6, 1885.

Application filed June 23, 1885. Serial No. 169,604. (Model.)

*To all whom it may concern:*

Be it known that I, JOSEPH J. PEARSON, of Batesville, in the county of Panola and State of Mississippi, have invented a new and useful Improvement in Bee-Hives, of which the following is a full, clear, and exact description.

Reference is to be had to the accompanying drawings, forming a part of this specification, in which similar letters of reference indicate corresponding parts in all the figures.

Figure 1:
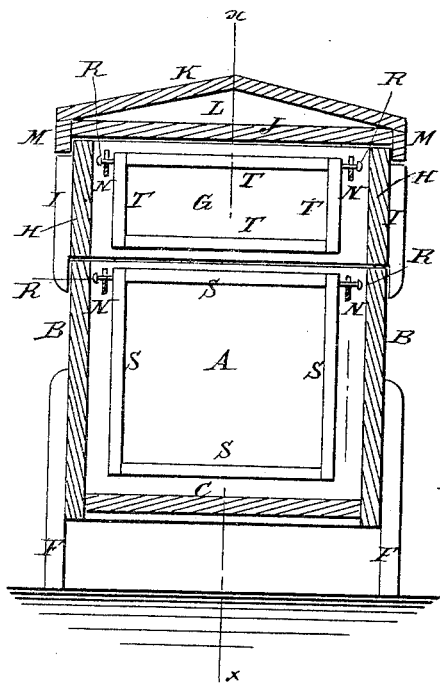
Figure 2:
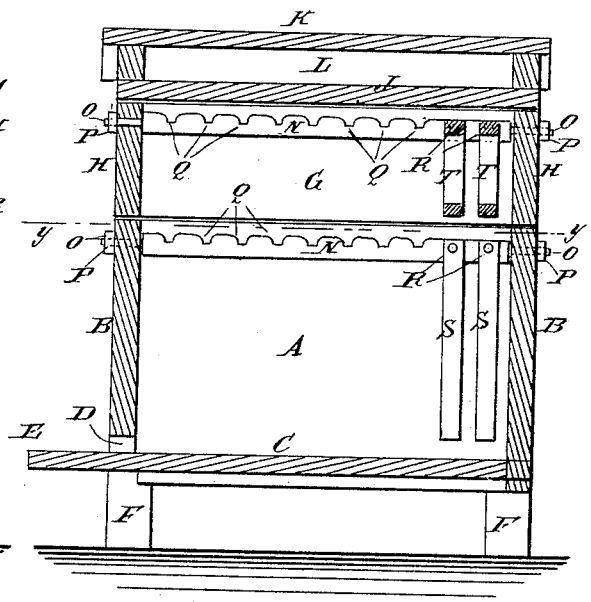
Figure 3:
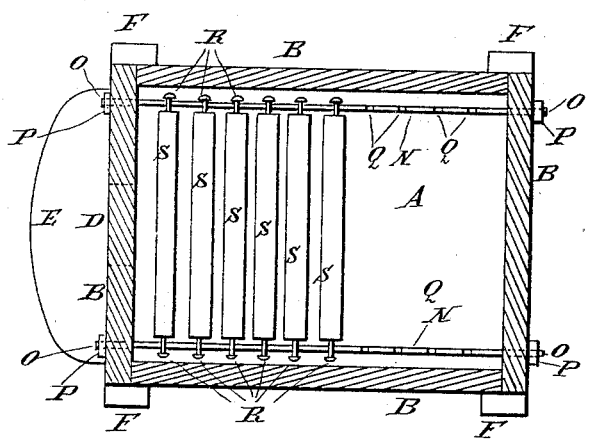

Figure 1 is a sectional end elevation of one of my improved bee-hives. Fig. 2 is a sectional side elevation of the same, taken through the line $x\,x$, Fig. 1; and Fig. 3 is a sectional plan view of the same, taken through the line $y\,y$, Fig. 2.

The object of this invention is to provide bee-hives constructed in such a manner as to afford a free passage-way for the bees over all parts of the inner surface of the hive, while furnishing a firm support for the comb-frames.

The invention consists in the combination, with the walls of the hive, of bars having screws and nuts at their ends for securing them to the hive, and recesses in their upper edges to receive pins attached to the upper corners of the comb-frames, as will be hereinafter fully described.

A is the brood-chamber, to the lower edges of the walls B of which is attached the bottom C. In the lower edge of the front wall of the brood-chamber A is formed a recess, D, through which the bees pass into and out of the hive. The front end, E, of the bottom C projects beyond the front wall of the brood-chamber A, to serve as a platform for the bees to alight upon and take flight from.

To the lower parts of the side walls of the brood-chamber A are attached short legs F, to support the hive with its bottom out of contact with the bench or table upon which the said hive stands.

G is the honey-chamber, which is made of exactly the same length and breadth as the brood-chamber A, so that the lower edges of the walls H of the said honey-chamber G will rest squarely upon the upper edges of the walls B of the said brood-chamber A. The honey-chamber G is kept in place upon the brood-chamber A by cleats I, the upper ends of which are attached to the walls H of the said honey-chamber G, and their lower ends overlap the walls B of the said brood-chamber A.

The cover of the hive is made with a flat bottom, J, to rest upon the upper edges of the walls H of the brood-chamber G, and with an angular or V-shaped top, K, to cause it to shed rain readily, and to form an air-chamber, L, to protect the bees from the heat of the sun. The cover J K is made with downwardly-projecting sides M, to overlap the walls of the honey-chamber G and keep the said cover in place.

N are bars, made preferably of metal, and which have screws O formed upon or attached to their ends, to pass through the upper parts of the walls of the brood-chamber A and honey-chamber G, and receive nuts P upon their outer ends, so that the bars, screws, and nuts N O P will serve as tie-rods to bind the walls of the hive together.

In the upper edges of the bars N are formed recesses or notches Q, to receive pins R, attached to the upper corners of the comb-frames S T. The recesses Q are made at such a distance apart that the comb-frames will be parallel, and will have sufficient space between them to prevent the combs of adjacent frames from coming in contact with each other.

The comb-frames S of the brood-chamber A and the comb-frames T of the honey-chamber G are made exactly alike, except that the frames S are deeper than the frames T, to correspond with the difference in depth of the said chambers.

The pins R are preferably made with heads, as shown in Figs. 1 and 3, so that the comb-frames S T will be held from longitudinal movement without having their side bars in contact with the supporting-bars N.

With this construction the inner surfaces of the brood-chamber A and of the honey-chamber G will be flush with each other, so that the bees can have an unobstructed passage over all parts of the inner surface of the hive, and will thus be prevented from attaching the combs or the comb-frames to the walls of the hive.

I am aware that bee-hives have been provided with bars having a series of notches to receive the pins on the comb-frames, and I do not claim the same as of my invention.

Having thus fully described my invention, I claim as new and desire to secure by Letters Patent—

The combination, with the walls of the hive, of bars N, having screws O and nuts P at their ends for securing them to the said walls, and having recesses Q in their upper edges to receive pins R, attached to the upper corners of the comb-frames, substantially as herein shown and described.

JOSEPH J. PEARSON.

Witnesses:
H. F. STEWART,
P. V. LESTER.